(12) United States Patent
Crawford et al.

(10) Patent No.: US 8,226,479 B2
(45) Date of Patent: Jul. 24, 2012

(54) GROUP DECISION HAPTIC FEEDBACK SYSTEMS AND METHODS

(75) Inventors: David W. Crawford, Long Beach, CA (US); Susan M. Bryan, Los Angeles, CA (US); Joseph O. Garlington, La Crescenta, CA (US); Raul Fernandez, Beverly Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1115 days.

(21) Appl. No.: 12/098,855

(22) Filed: Apr. 7, 2008

(65) Prior Publication Data

US 2011/0010618 A1    Jan. 13, 2011

(51) Int. Cl.
A63F 9/24    (2006.01)

(52) U.S. Cl. ............... 463/36; 463/37; 463/38; 463/42

(58) Field of Classification Search .............. 463/36–38, 463/42
See application file for complete search history.

(56) References Cited

U.S. PATENT DOCUMENTS

| | | | |
|---|---|---|---|
| 5,629,595 A | 5/1997 | Salter et al. | |
| 6,113,395 A | 9/2000 | Hon | |
| 6,337,678 B1 * | 1/2002 | Fish | 345/156 |
| 6,429,849 B1 | 8/2002 | An et al. | |
| 6,639,582 B1 | 10/2003 | Shrader | |
| 6,859,819 B1 | 2/2005 | Rosenberg et al. | |
| 864,877 A1 | 3/2005 | Braun et al. | |
| 7,245,202 B2 | 7/2007 | Levin | |
| 2006/0058103 A1 * | 3/2006 | Danieli et al. | 463/42 |
| 2007/0279392 A1 * | 12/2007 | Rosenberg et al. | 345/173 |

OTHER PUBLICATIONS

Hespanha et al., "Haptic Collaboration over the Internet" Integrated Media Systems Center, University of Southern California, 5 pages.
Hale et al., "Deriving Haptic Design Guidelines from Human Physiological, Psychophysical, and Neurological Foundations" IEEE Computer Graphics and Applications, pp. 33-39, 2004.
Ruddle et al., "Symmetric and Asymmetric Action Integration During Cooperative Object Manipulation in Virtual Environments" ACM Transactions on Computer-Human Interaction, vol. 9, pp. 285-308, 2002.

* cited by examiner

*Primary Examiner* — Omkar Deodhar
(74) *Attorney, Agent, or Firm* — Samuel K. Simpson; Patent Ingenuity, P.C.

(57) ABSTRACT

Systems and methods are provided that may be adapted for use with a plurality of user interface devices having haptic feedback interface mechanisms. A group controller may be adapted to determine a group decision input based, at least in part, on sensed outputs the user interface devices. At least a portion of the group decision input may be used to provide haptic feedback to a user via the user interface device.

35 Claims, 2 Drawing Sheets

GROUP DECISION HAPTIC FEEDBACK SYSTEMS AND METHODS

BACKGROUND

1. Field

The subject matter disclosed herein relates to user interactive systems, and more particularly to interactive systems and methods using haptic feedback.

2. Information

An interactive user interface may be adapted to allow a user to interact in some manner with a machine. For example, a video game console may include a controller that provides the user with a variety of buttons, knobs, control sticks, etc. through which the user may interact with a video game. Haptic feedback may be used to further increase the interactive experience of a user. For example, the user may interact with objects in a virtual or objects in real environment through a force feedback joystick, a force feedback steering wheel, or the like.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
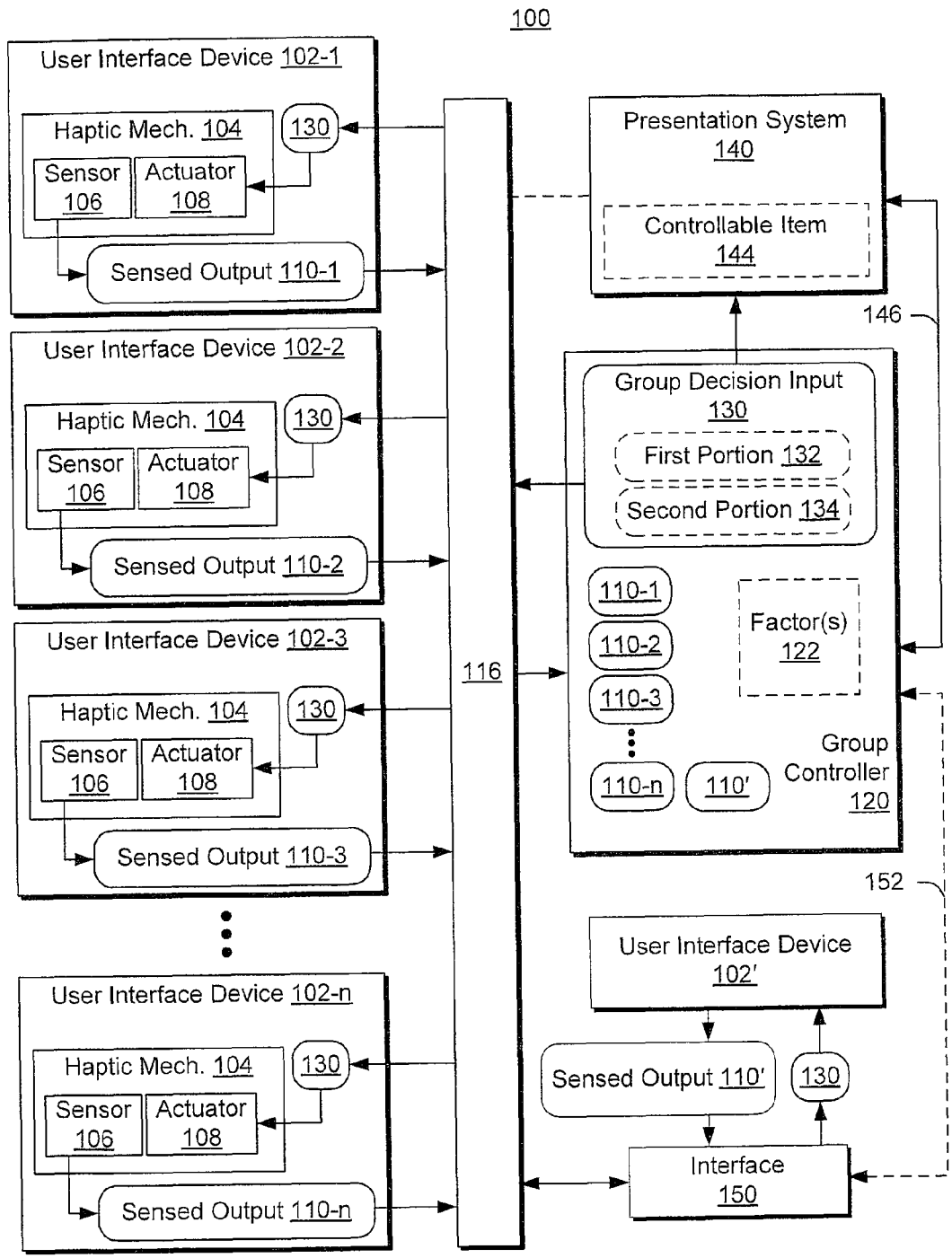
FIG. 1 is a block diagram illustrating an exemplary implementation of a system adapted to provide and use group decision haptic feedback in accordance with an embodiment.

In accordance with an aspect of an exemplary implementation, an interactive system may be adapted for use by two or more members of an audience to allow such members of the audience to provide input to an interactive presentation system as a group. The user interface devices that the members may manipulate may be adapted to respond in some manner based, at least in part, on a determined group decision a portion of which may be used to provide haptic feedback to the members of the audience via their respective user interface devices.

For example, the interactive presentation may include an amusement ride that may be adapted to allow a group of riders to make certain selections through the use of a plurality of haptic feedback user interface devices. Here, for example, such user interface devices may include a joystick, steering wheel, or the like, that may be adapted to allow members of the audience to attempt to interactively steer the ride or otherwise attempt to affect in some manner at least one controllable item (e.g., an object, a feature, etc.) associated with the ride. A group decision may be determined based, at least in part, on the sensed outputs from such user interface devices. A sensed output may, for example, include one or more signals, one or more mechanical responses, and/or the like.

Thus, for example, an amusement ride may include a vehicle of some sort and an audience may be allowed to interactively direct the vehicle to turn left or right. As such, in one situation one portion of the audience may desire a left turn while another portion of the audience may desire a right turn. The interactive system provided in this example, may be adapted to determine a group decision based on such varying inputs, for example, by applying a majority rule and/or the like. Thus, if sixty-percent of the audience members input a left turn and forty-percent input a right turn, then a majority rule may establish a group decision for a left turn. To reduce a potential impact of the majority rule based group decision on the minority of audience members desiring a right turn, the group decision for a left turn may provide haptic feedback control to the user interactive devices as applicable. For example, while a member of the audience may have initially turned a steering wheel to the right to indicate a desire for a right turn, as a result of the group decision this member's steering wheel may be physically transitioned from a right turn to a left turn by one or more actuators based, at least in part, on a group decision input to the user interface device. A group decision input may, for example, include one or more signals, one or more mechanical responses, and/or the like.

In the exemplary system above, the user interface devices may, for example, include at least one haptic feedback interface mechanism that may be responsive to at least a portion of a group decision input. Such a group decision input may, for example, be determined by a group controller based, at least in part, on one or more sensed outputs from the haptic feedback interface mechanisms.

A presentation system may, for example, be adapted to be responsive to at least a portion of the group decision. Thus, in the amusement ride example above, at least a portion of the group decision input may be provided to the presentation system which may be adapted to respond accordingly by having the controllable item (here, a vehicle) perform a left turn.

In accordance with another aspect of the above exemplary implementation, the audience may include members that may be "onboard" the vehicle and/or members that may not be "onboard" the vehicle. Thus, such a group decision may be indicative of user input associated with riders and/or non-riders of the vehicle. For example, audience members that may be watching other members onboard the vehicle may interact with the system through such user interface devices. In certain implementations, for example, audience members that may be queued and waiting to "board" the vehicle may interact with the system through such user interface devices. In certain implementations, for example, audience members that may have already been "onboard" the vehicle may interact with the system through such user interface devices. In certain other implementations, for example, audience members that may be remotely located from the vehicle and/or amusement ride itself (e.g., hundreds of miles away) may interact with the system through such user interface devices.

Certain exemplary systems and methods will now be presented that may implement certain techniques that may, for example, be adapted for use in the above amusement ride implementation, and/or a variety of other types of implementations that may or may not include a presentation system.

With this in mind, attention is drawn to FIG. 1, which is a block diagram illustrating an exemplary interactive system 100 that may, for example, include two or more user interface devices 102, such as, for example, user interface device 102-1, 102-2, 102-3, through 102-n, and/or user interface device 102'. Each user interface device 102 may include one or more haptic feedback interface mechanisms 104.

User interface devices 102 may be representative of any applicable type of haptic feedback device that may be responsive to physical user input(s) and/or at least a portion of group decision input 130. By way of example, but not limitation, user interface devices 102 may include a joystick, a steering wheel, or other like selective and/or directional input haptic feedback and/or other like interface mechanisms such as, for example, those available from Immersion Corporation of San Jose, Calif.

One or more of user interface devices 102-1 . . . 102-n may, for example, include at least one haptic feedback interface mechanism 104 having at least one sensor 106 or other like mechanism. As illustrated sensor 106 may produce or otherwise generate at least a portion of at least one sensed output 110 based, at least in part, on user manipulation of haptic feedback interface mechanism 104. As illustrated in exemplary interactive system 100, sensor 106 of user interface device 102-1 may provide sensed output 110-1, sensor 106 of user interface device 102-2 may provide sensed output 110-2, sensor 106 of user interface device 102-3 may provide sensed output 110-3, and sensor 106 of user interface device 102-n may provide sensed output 110-n. Similarly, although not illustrated, user interface device 102' may include at least one haptic feedback interface mechanism that include at least one sensor or other like mechanism that may be adapted to produce at least a portion of at least one sensed output 110'. In certain implementations, two or more of user interface devices 102 may be alike in design/purpose or may be of differing design/purpose.

User interface devices 102-1 . . . 102-n may, for example, include at least one haptic feedback interface mechanism 104 having one or more actuators 108 that may be adapted to selectively manipulate at least a portion of the haptic feedback interface mechanism based, at least in part, on at least a portion of a group decision input 130.

Those skilled in the art will recognize that a variety of different types of sensors 106 and actuators 108 may be adapted for use in haptic feedback interface mechanism 104. By way of example but not limitation, sensor 106 may include one or more electrical, mechanical, optical, magnetic, hydraulic, pneumatic, and/or other like adaptable sensors that may be activated or otherwise affected in some manner based, at least in part, in response to user manipulation of haptic feedback interface mechanism 104. By way of example but not limitation, actuator 108 may include one or more electrical, mechanical, magnetic, hydraulic, pneumatic, and/or other like adaptable actuators that may be activated or otherwise affected in some manner based, at least in part, on group decision input 130.

As illustrated, user interface devices 102-1 . . . 102-n may, for example, be adapted to provide sensed outputs 110-1 . . . 110-n, respectively, to a group controller 120 through at least one coupling mechanism 116. As illustrated, user interface devices 102-1 . . . 102-n may, for example, be adapted to receive at least a portion of group decision input 130 as provided by group controller 120 through at least one coupling mechanism 116.

As shown, one or more user interface devices, such as user interface device 102', may be adapted to provide sensed output 110' to group controller 120 via an interface 150 and at least one coupling mechanism 116. User interface device 102' may, for example, be adapted to receive at least a portion of group decision input 130 as provided by group controller 120 via at least one coupling mechanism 116 and/or interface 150. Thus, for example, user interface device 102' may be different from and/or remotely located from one or more other user interface devices 102-1 . . . 102-n, but adapted nonetheless in some manner via interface 150 to provide sensed output 110' to group controller 120 and receive at least a portion of group decision input 130. As such, in one example, user interface device 102' may be remotely located and electrically coupled via interface 150 to group controller 120 while one or more of user interface devices 102-1 . . . 102-n are mechanically coupled via coupling mechanism 116 to group controller 120.

For example, interface 150 may include an adapter, a bridge, and/or other like device or mechanism, which may convert, as needed, at least a portion of a sensed output and/or group decision input. Thus, for example, in certain implementations, interface 150 may convert electrical or optical signals into corresponding mechanical, hydraulic, pneumatic, or other like actions and/or vise versa. In certain implementations, for example, interface 150 may convert between differing electrical and/or optical signal formats, protocols, etc.

In certain exemplary implementations, design differences, location differences or other like differences associated with the interface devices 102 may allow for different "audiences" of one or more users to operatively interface with system 100. For example, in certain implementations a first audience may operatively interface with one or more user interface devices arranged in a first location and a second audience may operatively interface with one or more other user interface devices arranged in a second location. For example, in certain implementations a first audience may operatively interface with one or more user interface devices of a first type, design and/or purpose and a second audience may operatively interface with one or more other user interface devices of a second type, design and/or purpose.

As illustrated by dashed line connection 152, user interface device 102' may, for example, additionally or optionally be adapted to provide sensed output 110' to group controller 120 via connection 152, and/or to receive group decision input 130 as provided by group controller 120 via connection 152.

Coupling mechanism 116 may, for example, include one or more mechanical coupling mechanisms, one or more electrical coupling mechanisms, one or more optical coupling mechanisms, one or more electromagnetic coupling mechanisms, one or more magnetic couplings, or any combination thereof that may, for example, be adapted to carry or otherwise provide sensed outputs 110 from applicable user interface devices 102 to group controller 120, or group decision input 130 from group controller 120 to applicable user interface devices 102.

Thus, for example, in certain implementations, coupling mechanism 116 may include one or more "wired" or "wireless" communication resources that may be adapted to communicate sensed outputs and/or group decision inputs via one or more digital and/or analog signals. In certain implementations, coupling mechanism 116 may include one or more mechanical resources that may be adapted to communicate sensed outputs and/or group decision inputs via mechanical linkages, hydraulic pressures, pneumatic pressures or vacuums, magnetic forces, or other like actions.

As such, as previously indicated, interface 150 may, for example, include one or more mechanical, electrical, optical, electromagnetic, or other like mechanisms as may be needed to convert or otherwise transform in some manner sensed output 110' so that it may be properly carried by or otherwise be provided through coupling mechanism 116 and/or connection 152 to group controller 120. Interface 150 may, for example, include one or more mechanical, electrical, optical, electromagnetic, or other like mechanisms, as may be needed, to convert or otherwise transform in some manner at least a portion of group decision input 130. Such conversion and/or transformation may therefore allow at least a portion of group decision input 130 to be provided to user interface device 102' through coupling mechanism 116 and/or connection 152 from group controller 120.

Group controller 120 may, for example, determine or otherwise establish a group decision input 130. In certain implementations, group decision input 130 may, for example, include a single group decision input 130 that may be adapted for use by each user interface device 102. In certain implementations, group decision input 130 may, for example, include a plurality of separate group decision inputs 130 wherein the separate group decision input 130 may be adapted for one or more applicable user interface devices 102.

In certain exemplary implementations, group decision input 130 may include a first portion 132 that may be adapted for use by at least one applicable user interface device 102, and a second portion 134 that may adapted for use by at least one other applicable user interface device 102.

In certain exemplary implementations, group decision input 130 may include a first portion 132 that may be adapted for use by at least one applicable user interface device 102, and a second portion 134 that may adapted for use by a presentation system 140.

Group controller 120 may, for example, be adapted to determine or otherwise establish at least a portion of group decision input 130 based, at least in part, on two or more of the received sensed outputs 110. For example, group controller 120 may be adapted to determine or otherwise establish at least a portion of group decision input 130 based, at least in part, on a majority rule decision associated with two or more of the received sensed outputs 110, a combination and/or a comparison of two or more received sensed outputs 110, or one or more statistical measurements (e.g., a mean value, a median value, or other like mathematically determined value) associated with two or more received sensed outputs 110, or any combination thereof.

Group controller 120 may, for example, be adapted to determine or otherwise establish at least a portion of group decision input 130 based, at least in part, on one or more decision factors 122. Decision factors 122 may, for example, include one or more weighting factors, one or more timing factors, one or more threshold factors, or other like factors or any combination thereof.

By way of example, group controller 130 may be adapted to apply or selectively apply one or more weighting factors that may affect in some manner (e.g., increase, decrease) one or more of the received sensed outputs 110 and/or at least a portion of the resulting group decision input 130. As such, one or more user interface devices may effectively have greater or less influence on the resulting group decision input than another.

For example, group controller 130 may be adapted to apply or selectively apply one or more timing factors that may affect in some manner the reception of one or more of sensed outputs 110 and/or the determination or otherwise establishment of at least a portion of the resulting group decision input 130. For example, in certain implementations a timing factor may be used to establish a dynamic or discrete operation of group controller 120. Thus, for example, group controller 120 may be adapted to operate in a dynamic manner wherein group controller 120 continuously receives sensed outputs 110 and/or continuously determines or otherwise establishes at least a portion of group decision input 130. Conversely, in another example, group controller 120 may be adapted to operate in a more discrete manner wherein group controller 120 discretely receives sensed outputs 110 and/or discretely determines or otherwise establishes at least a portion of group decision input 130.

In certain implementations a threshold factor may, for example, be used to establish a responsiveness operation of group controller 120. In this manner, for example, group controller 120 may be adapted to operate with a selected responsiveness by only considering sensed outputs 110 that may fall within an established acceptable range as may be defined by one or more threshold factors. As such, in some situations only a portion of the sensed outputs may influence (e.g., be used to determine or otherwise establish at least a portion of) group decision input 130. For example, a received sensed output 110 that fails a threshold test may be affected in some manner (e.g., ignored). In another example, group controller 120 may be adapted to operate with a selected responsiveness by limiting or otherwise affecting in some manner at least a portion of group decision input 130. Group controller 120 may, for example, be adapted to produce, update, and/or change at least a portion of group decision input 130 based on a threshold test being satisfied. Here, for example, group decision input 130 may not be provided or changed until one or more received sensed outputs is determined to be within an acceptable range as may be defined by one or more threshold values. In another example, group decision input 130 may not be provided or changed until group decision input 130 itself is determined to be within an acceptable range as may be defined by one or more threshold values.

Those skilled in the art should recognize that group controller 120 may be implemented in a variety of ways depending on the design of interactive system 100. For example, group controller 120 may include one or more digital and/or analog electrical circuits (not shown) that may be adapted to receive sensed outputs 110 in the form of electrical, optical or other like electromagnetic signals and/or provide at least portion of group decision input 130 in the form of electrical, optical or other like electromagnetic signals. Thus, for example, in certain "electronic" implementations group controller 120 may include one or more computing resources (not shown) that may be adapted to determine at least a portion of group decision input 130 as described herein. Such computing resources may include, for example, hardware, firmware, software, or any combination thereof. In certain "analog" implementations group controller 120 may include one or more analog feedback control circuitry (not shown) that may be adapted to determine at least a portion of group decision input 130 as described herein.

Group controller 120 may, for example, be provided, at least in part, through a variety of "mechanical" implementations. For example, as previously illustrated, mechanical linkages, hydraulic pressures, pneumatic pressures or vacuums, or other like actions may be used to convey sensed outputs 110 and/or at least a portion of group decision input 130 between user interface device 102 and group controller 120, via coupling mechanism 116. Thus, in certain implementations, all or portions of group controller 120 may be implemented in some mechanical manner. Thus, for example, at least a portion of a group decision process may be implemented using mechanical elements (not shown) such as gears, cams, springs, levers, etc. For example, at least a portion of a group decision process may be implemented using fluidic elements (not shown) based on hydraulic and/or pneumatic pressures or vacuums, such as pumps, pistons, accumulators, valves, regulators, solenoids, magnetic equipment and forces, etc.

A presentation system 140 may, for example, be operatively coupled to group controller 120. As illustrated in FIG. 1, presentation system 140 may be opertively coupled to group controller through one or more connections 146 and/or possibly through coupling mechanism 116 as illustrated by the dashed line. Presentation system 140 may, for example, be adapted to receive at least a portion of group decision input 130. In certain implementations, presentation system 140 may, for example, be adapted to provide a response or other like input to group controller 120 and/or one or more user interface devices 102.

As with the other exemplary elements presented herein of interactive system 100, presentation system 140 (which may be optional) may be electrically, optically or otherwise electromagnetically coupled to one or more of the other elements, and/or mechanically, hydraulically and/or pneumatically coupled to one or more of the other elements.

Presentation system 140 may, for example, be adapted to selectively control or otherwise affect in some manner at least one controllable item 144 based, at least in part, in response to at least a portion of group decision input 130. By way of example, presentation system 140 may be adapted to selectively control or otherwise affect in some manner a physical item control operation, a virtual item control operation, a visible item control operation, an audible item operation, or any combination thereof based, at least in part, on at least a portion of group decision input 130. A physical item control operation may, for example, include controllably manipulating or otherwise operatively affecting one or more physical items such as a portion of an amusement ride, a portion of a mechanism, a prop, an actor, and/or the like. A virtual item control operation may, for example, include controllably manipulating or otherwise operatively affecting one or more virtual items such as may be presented in a virtual computer-simulated environment, a virtual reality gaming environment, an animated environment, and/or the like. A visible item control operation may, for example, include controllably manipulating or otherwise operatively affecting one or more visible items such as a projected image (e.g., film, video, virtual environment, etc.), stage-lighting, laser light shows, and/or the like. An audible item operation may, for example, include controllably manipulating or otherwise operatively affecting one or more audible items such as a sound effect, a voice, music, and/or the like.

Presentation system 140 may, for example, be operatively associated with one or more audiences having one or more members. In certain implementations, at least a portion of at least one audience may be operatively associated with at least one user interface device 102. In certain implementations, at least a portion of at least one audience may not be operatively associated with a user interface device 102.

Presentation system 140 may, for example, include an amusement ride presentation system, a theatrical performance presentation system, a game playing presentation system, a media presentation system, and/or the like. In certain implementations, such presentation systems may be associated with one or more audiences such as, for example, a primary audience and a secondary audience. Here, for example, a primary audience in an amusement ride presentation system may include current passengers of the amusement ride and a secondary audience may include previous or subsequent passengers, spectators or other non-passengers. In certain implementations, for example, one or more members of one or more audiences may at least attempt to affect presentation system 140 in some manner based, at least in part, on interacting with at least one user interface device 102.

Figure 2:
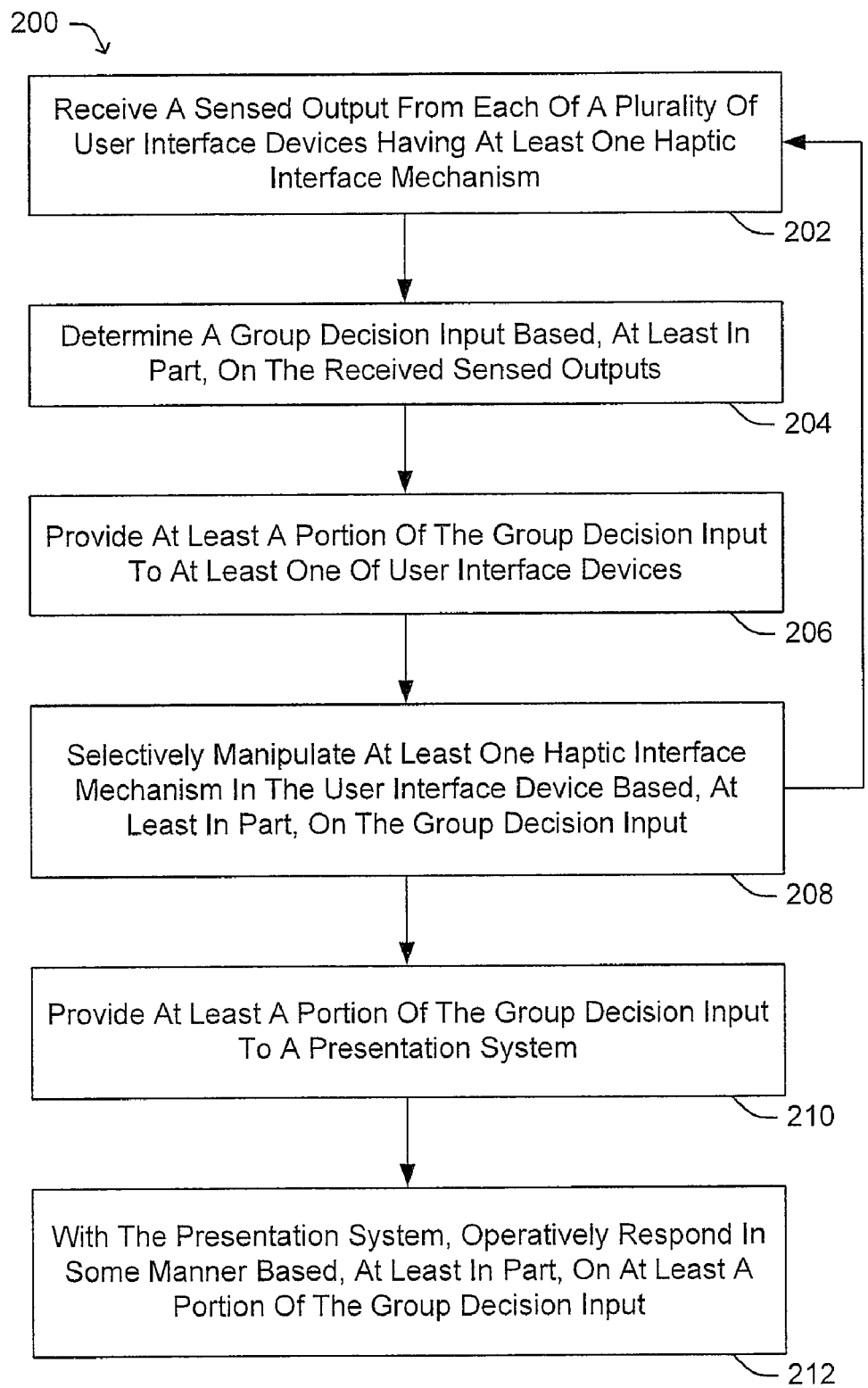
FIG. 2 is a flow diagram illustrating an exemplary implementation of a method adapted to provide and use group decision haptic feedback in accordance with an embodiment.

Reference is now made to FIG. 2, which is a flow diagram illustrating an exemplary method 200.

At block 202, a sensed output may be received from each of two or more user interface devices. For example, such a sensed output may be proportional or otherwise related to some form of user manipulation of a haptic feedback interface mechanism. A sensed output may take the form of one or more signals (e.g., digital, analog) transmitted over one or more wires, conductors, optical fibers, wireless communication links, etc. A sensed output may take of the form of one or more mechanical responses (e.g., mechanical, fluidic) conveyed through one or more linkages, hydraulic pressures, pneumatic pressures or vacuums, etc.

At block 204, a group decision input may be determined based, at least in part, on the received sensed outputs. At least a portion of the group decision input may be determined based, at least in part, on one or more decision factors such as, for example, one or more weighting factors, one or more timing factors, one or more threshold factors, or other like factors or any combination thereof. At least a portion of the group decision input may take of the form of one or more signals (e.g., digital, analog) transmitted over one or more wires, conductors, optical fibers, wireless communication links, etc. At least a portion of the group decision input may take the form of one or more mechanical responses (e.g., mechanical, fluidic) conveyed through one or more linkages, hydraulic pressures, pneumatic pressures or vacuums, etc.

At block 206, at least a portion of the group decision input may be provided to at least one of user interface devices. For example, at least a portion of the group decision input may be provided to at least one of user interface devices through a coupling mechanism that may be adapted to carry signals (e.g., digital, analog) using one or more wires, conductors, optical fibers, wireless communication links, etc. For example, at least a portion of the group decision input may be provided to at least one of user interface devices through a coupling mechanism that may be adapted to convey actions (e.g., mechanical, fluidic) through one or more linkages, hydraulic pressures, pneumatic pressures or vacuums, magnetic forces, etc.

At block 208, at least one haptic feedback interface mechanism may be selectively manipulated in the user interface device based, at least in part, on the group decision input. For example, a haptic feedback interface mechanism may be selectively manipulated using a motor, a shaker, a vibrator, a solenoid, an electromagnet, and/or the like based, at least in part, on at least one signal (e.g., digital, analog) associated with the group decision input. For example, a haptic feedback interface mechanism may be selectively manipulated using a cam, a gear, a piston, a cable, and/or the like based, at least in part, on at least one action (e.g., mechanical, fluidic) associated with the group decision input.

At block 210, at least a portion of the group decision input may be provided to a presentation system. For example, at least a portion of the group decision input may be provided to the presentation system through a coupling mechanism and/or other like connection that may be adapted to carry signals (e.g., digital, analog) using one or more wires, conductors, optical fibers, wireless communication links, etc. For example, at least a portion of the group decision input may be provided to the presentation system through a coupling mechanism and/or other like connection that may be adapted to convey actions (e.g., mechanical, fluidic) through one or more linkages, hydraulic pressures, pneumatic pressures or vacuums, etc.

At block 212, the presentation system may operatively respond in some manner based, at least in part, on the group decision input. For example, the presentation system may be adapted to selectively control or otherwise affect in some manner at least one control operation associated with a physical item (e.g., an object, a vehicle, a prop, a light, a mist, a smell, an air temperature, an object's temperature, etc.), a virtual item (e.g., a computer modeled object, a graphic element, a computer modeled environment, streaming media content, etc.), a visible item (e.g., visible to a member of an audience through video or image rendering, display or projection, and/or human, robotic or animatronics performance, etc.), an audible item (e.g., a sound that may be heard or felt by a member of an audience), or any combination thereof based, at least in part, on at least a portion of group decision input.

While certain exemplary techniques have been described and shown herein using various systems and methods, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A system comprising:
    a plurality of user interface devices, each of said user interface devices comprising one or more haptic feedback interface mechanisms, at least one sensor adapted to produce a sensed output based, at least in part, on direct user manipulation of at least one of said one or more haptic feedback interface mechanisms, and one or more actuators adapted to selectively manipulate at least one of said one or more haptic feedback interface mechanisms based, at least in part, on a group decision input; and
    a group controller operatively coupled to each of said plurality of user interface devices and adapted to determine said group decision input based, at least in part, on said sensed output produced by said plurality of user interface devices and one or more decision factors that include one or more weighting factors, one or more timing factors, and/or one or more threshold factors.

2. The system as recited in claim 1, and further comprising:
    a presentation system operatively coupled to said group controller and adapted to operatively respond based, at least in part, on said group decision input.

3. The system as recited in claim 2, wherein said presentation system is adapted to operatively respond based, at least in part, on said group decision input through at least one selectively controlled operation selected from a group of operations comprising a physical item control operation, a virtual item control operation, a visible item control operation, and an audible item operation.

4. The system as recited in claim 2, wherein said group decision input comprises at least a first portion adapted for use by at least one of said plurality of user interface devices and a second portion adapted for use by said presentation system.

5. The system as recited in claim 2, wherein said presentation system comprises at least one presentation system selected from a group of presentation systems comprising an amusement ride presentation system, a theatrical performance presentation system, a media presentation system, and a game playing presentation system.

6. The system as recited in claim 5, wherein said presentation system is adapted for presentation to a primary audience and wherein at least one of said plurality of user interface devices is adapted for use by at least one user that is not within said primary audience.

7. The system as recited in claim 1, wherein said group decision input is based, at least in part, on a majority rule decision.

8. The system as recited in claim 1, wherein said group decision input is based, at least in part, on a combination of a plurality of said sensed outputs.

9. The system as recited in claim 1, wherein said group decision input is based, at least in part, on a comparison of a plurality of said sensed outputs.

10. The system as recited in claim 1, wherein said group decision input is based, at least in part, on a statistical measurement of a plurality of said sensed outputs.

11. The system as recited in claim 1, wherein said group decision input is based, at least in part, on at least one decision factor selected from a group of factors comprising a weighting factor, a timing factor, and a threshold factor.

12. The system as recited in claim 1, wherein said group decision input comprises a single group decision input adapted for use by each of said plurality of user interface devices.

13. The system as recited in claim 1, wherein at least one of said plurality of user interface devices and said group controller are operatively coupled together, at least in part, through at least one coupling mechanism selected from a group of coupling mechanisms comprising a mechanical coupling mechanism, an electrical coupling mechanism, an optical coupling mechanism, and an electromagnetic coupling mechanism.

14. The system as recited in claim 1, wherein at least two of said user interface devices are at least substantially alike.

15. The system as recited in claim 1, wherein said sensed output comprises at least one signal.

16. The system as recited in claim 1, wherein said sensed output comprises at least one mechanical response.

17. An apparatus comprising a group controller adapted to receive at least one sensed output from each of a plurality of user interface devices having one or more haptic feedback interface mechanisms, and determine a group decision input based, at least in part, on a plurality of said received sensed outputs and one or more decision factors that include one or more weighting factors, one or more timing factors, and/or one or more threshold factors, and wherein at least a portion of said group decision input is adapted for use by each of said plurality of user interface devices to selectively manipulate at least one of said one or more haptic feedback interface mechanisms.

18. The apparatus as recited in claim 17, wherein said group decision input is adapted for use by a presentation system that operatively responds based, at least in part, on at least a portion of said group decision input.

19. The apparatus as recited in claim 17, wherein at least one of said plurality of received sensed outputs comprises at least one signal.

20. The apparatus as recited in claim 17, wherein at least one of said plurality of received sensed outputs comprises at least one mechanical response.

21. A method comprising:
    receiving a sensed output from each of a plurality of user interface devices, wherein each of said user interface devices comprises one or more haptic feedback interface mechanisms, and at least one sensor, said at least one sensor being adapted to produce said sensed output based, at least in part, on direct user manipulation of at least one of said one or more haptic feedback interface mechanisms;
    determining a group decision input based, at least in part, on at least a portion of said received sensed output from each of said plurality of user interface devices;
    providing at least a portion of said group decision input to each of said plurality of user interface devices; and wherein each of said user interface devices further comprises one or more actuators adapted to selectively manipulate at least one of said one or more haptic feedback interface mechanisms therein based, at least in part, on at least said portion of said group decision input and one or more decision factors that include one or more weighting factors, one or more timing factors, and/or one or more threshold factors.

22. The method as recited in claim 21, and further comprising:
providing at least a portion of said group decision input to a presentation system that is adapted to operatively respond based, at least in part, on at least said portion of said group decision input.

23. The method as recited in claim 22, wherein said presentation system is adapted to operatively respond based, at least in part, on at least said portion of said group decision input through at least one selectively controlled operation selected from a group of operations comprising a physical item control operation, a virtual item control operation, a visible item control operation, and an audible item operation.

24. The method as recited in claim 22, wherein said group decision input comprises at least a first portion adapted for use by at least one of said plurality of user interface devices and a second portion adapted for use by said presentation system.

25. The method as recited in claim 22, wherein said presentation system comprises at least one presentation system selected from a group of presentation systems comprising an amusement ride presentation system, a theatrical performance presentation system, a media presentation system, and a game playing presentation system.

26. The method as recited in claim 25, wherein said presentation system is adapted for presentation to a primary audience and wherein at least one of said plurality of user interface devices is adapted for use by at least one user that is not within said primary audience.

27. The method as recited in claim 21, wherein determining said group decision input comprises determining said group decision input based, at least in part, on a majority rule decision.

28. The method as recited in claim 21, wherein determining said group decision input comprises determining said group decision input based, at least in part, by combining a plurality of said received sensed outputs.

29. The method as recited in claim 21, wherein determining said group decision input comprises determining said group decision input based, at least in part, by comparing a plurality of said received sensed outputs.

30. The method as recited in claim 21, wherein determining said group decision input comprises determining said group decision input based, at least in part, on a statistical measurement of a plurality of said received sensed outputs.

31. The method as recited in claim 21, wherein determining said group decision input comprises determining said group decision input based, at least in part, on at least one decision factor selected from a group of factors comprising a weighting factor, a timing factor, and a threshold factor.

32. The method as recited in claim 21, wherein said group decision input comprises a single group decision input adapted for use by each of said plurality of user interface devices.

33. The method as recited in claim 21, wherein at least one of said plurality of user interface devices and said group controller are operatively coupled together through at least one coupling mechanism selected from a group of coupling mechanisms comprising a mechanical coupling mechanism, an electrical coupling mechanism, an optical coupling mechanism, a magnetic coupling mechanism, and an electromagnetic coupling mechanism.

34. The method as recited in claim 21, wherein said sensed output comprises at least one signal.

35. The method as recited in claim 21, wherein said sensed output comprises at least one mechanical response.

* * * * *